| (12) | United States Patent<br>Wehner | (10) Patent No.: US 8,784,656 B2<br>(45) Date of Patent: Jul. 22, 2014 |
|---|---|---|

(54) PRELIMINARY FILTER FOR A FUEL DELIVERY UNIT

(75) Inventor: Holger Wehner, Bad Soden-Altenhain (DE)

(73) Assignee: Continental Automotive GmbH, Hannover (DE)

( * ) Notice: Subject to any disclaimer, the term of this patent is extended or adjusted under 35 U.S.C. 154(b) by 921 days.

(21) Appl. No.: 12/668,288

(22) PCT Filed: Jun. 6, 2008

(86) PCT No.: PCT/EP2008/057089
§ 371 (c)(1),
(2), (4) Date: Jan. 8, 2010

(87) PCT Pub. No.: WO2009/007184
PCT Pub. Date: Jan. 15, 2009

(65) Prior Publication Data
US 2010/0181245 A1 Jul. 22, 2010

(30) Foreign Application Priority Data
Jul. 10, 2007 (DE) .......................... 10 2007 032 057

(51) Int. Cl.
*B01D 35/027* (2006.01)
*F02M 37/22* (2006.01)

(52) U.S. Cl.
CPC .......... *B01D 35/027* (2013.01); *B01D 35/0273* (2013.01); *F02M 37/22* (2013.01)
USPC ......... 210/232; 210/172.4; 210/460; 210/461

(58) Field of Classification Search
CPC ... B01D 35/027; B01D 35/0273; F02M 37/22
USPC ................................ 210/232, 460, 461, 172.4
See application file for complete search history.

(56) References Cited

U.S. PATENT DOCUMENTS

| 3,826,372 | A | | 7/1974 | Bell |
|---|---|---|---|---|
| 4,224,161 | A | | 9/1980 | Anderson et al. |
| 4,523,992 | A | | 6/1985 | Sackett |
| 4,561,977 | A | | 12/1985 | Sasaki |
| 4,783,260 | A | | 11/1988 | Kurihara |
| 4,874,510 | A | | 10/1989 | Akira et al. |
| 5,928,507 | A | * | 7/1999 | Chiga ........................ 210/172.4 |
| 6,821,422 | B1 | * | 11/2004 | Brzozowski et al. ...... 210/416.4 |
| 2002/0079265 | A1 | | 6/2002 | Ito et al. |
| 2005/0006300 | A1 | | 1/2005 | Sato et al. |
| 2005/0087485 | A1 | | 4/2005 | Takahashi |

FOREIGN PATENT DOCUMENTS

| CN | 1623626 A | 6/2005 |
|---|---|---|
| DE | 34 08 520 | 9/1984 |
| EP | 400170 A1 * | 12/1990 |
| FR | 2 775 735 | 9/1999 |
| GB | 2 407 281 | 4/2005 |
| JP | 4-129870 U | 11/1992 |
| JP | 10-274169 A | 10/1998 |
| JP | 2002191913 A | 7/2002 |
| JP | 2005030351 A | 2/2005 |

* cited by examiner

*Primary Examiner* — Thomas M Lithgow
(74) *Attorney, Agent, or Firm* — Cozen O'Connor

(57) ABSTRACT

A preliminary filter for a fuel delivery unit of a motor vehicle, with a filter fabric which is tensioned by a supporting edge. The supporting edge is manufactured integrally with a connecting piece for connection to the fuel delivery unit and with transverse webs and supporting ribs. The preliminary filter has few components to be assembled and can be manufactured particularly cost-effectively.

12 Claims, 2 Drawing Sheets

PRELIMINARY FILTER FOR A FUEL DELIVERY UNIT

PRIORITY CLAIM

This is a U.S. national stage of application No. PCT/EP2008/057089, filed on 6 Jun. 2008, which claims Priority to the German Application No.: 10 2007 032 057.6, filed: 10 Jul. 2007, the contents of both being incorporated herein by reference.

BACKGROUND OF THE INVENTION

1. Field of the Invention

The invention relates to a prefilter for a fuel delivery unit of a motor vehicle having a filter fabric, a connection piece for connecting to the fuel pump, and a support element for supporting the filter fabric.

2. Related Art

Prefilters are often used in present-day motor vehicles for the filtration of various fuels, such as diesel or gasoline. To produce a prefilter for the filtration of gasoline, a fabric blank corresponding to a layout of a finished prefilter is punched out from a synthetic fabric. This fabric blank is introduced into a plastic injection mold. In the injection mold, a plurality of support elements and a connection piece are injection-molded onto the fabric blank. So that the fabric blank can be fixed in the injection mold, tabs and protrusions are provided on the fabric blank. After the injection molding operation, the fabric blank is folded into the prefilter, and the margins are welded to one another and trimmed.

In filters intended for diesel fuel, a fabric blank is deep-drawn from a metal fabric for an upper part and a lower part. These fabric blanks are subsequently introduced individually into an injection mold, and the connection piece and support elements are injection-molded on. Finally, the two fabric blanks are laid with their margins one on the other and sealed by means of a frame.

The known prefilters have the disadvantage that they are very complicated to manufacture and require a large number of machining steps.

SUMMARY OF THE INVENTION

The problem on which the invention is based is to configure a prefilter of the type initially mentioned, such that it is especially simple to manufacture and has high stability.

This problem is solved, according to one embodiment of the invention, in that the support element is manufactured in one piece with the connection piece.

By virtue of this configuration, with the support element being shaped appropriately, the filter fabric can be fastened after the manufacture of the support element and connection piece. It is consequently no longer necessary to inject the support element and the connection piece around the filter fabric in an injection mold. The one-piece component including the connection piece and of the support element can selectively be connected to a synthetic fabric for gasoline fuels or to a metal fabric for diesel fuels. In the simplest instance, therefore, the prefilter according to the invention has two components and is especially simple to assemble. The number of machining steps is kept especially low.

According to an advantageous development of the invention, a chamber for collecting fuel can be generated in a simple way if the support element has a support margin and if at least one of the end faces of the support margin is fastened to the filter fabric. Furthermore, the support margin has a simple shape for fastening the filter fabric.

The prefilter according to the invention has a large surface area of the filter fabric if a portion of the filter fabric is fastened sealingly to each of the two end faces of the support margin.

According to another advantageous development of the invention, the situation where filter fabrics opposite one another lie one against the other can be avoided in a simple way if the filter fabric is tensioned by the support margin. Furthermore the prefilter according to the invention has especially high inherent stability.

The support margin could have a U-shaped configuration. A contribution to further increasing the stability of the prefilter according to the invention is made if the support margin is designed as a closed frame.

According to another advantageous development of the invention, manufacturing the connection piece in one piece with the support margin is especially simple in structural terms if the connection piece is connected to the support margin via webs.

According to another advantageous development of the invention, to further increase the stability of the prefilter, according to one embodiment of the invention, the support margin has, on its side facing away from the connection piece, transverse webs for supporting the filter fabric.

The support margin can be manufactured together with the connection piece and the transverse webs in an axial-removal die if the transverse webs are arranged to be offset with respect to the connection piece. The possibility of axial removal from the die allows the use of a single die for the entire prefilter. This configuration contributes to low manufacturing costs for the prefilter according to the invention.

According to another advantageous development of the invention, a contribution to further increasing the stability of the prefilter according to the invention is made if the connection piece has support ribs for supporting the filter fabric, and if the support ribs are level with the opposite end face of the support margin. A contribution to further simplifying the set-up of the prefilter according to the invention is made if the connection piece has a flange for sealing a connection to the filter fabric.

A contribution to further reducing the manufacturing costs of the prefilter according to the invention is made if the support element is manufactured from plastic by an injection molding method. A further advantage of this configuration is that, after the manufacture of the support element, the filter fabric manufactured from plastic can be fastened to the support element simply by welding. Moreover, during welding, the filter fabric can be sealed on the support element. A filter fabric manufactured from metal can likewise be fastened in a materially integral manner and sealingly in a simple way after the fusion of the connecting points of the support element.

BRIEF DESCRIPTION OF THE DRAWINGS

The invention permits numerous embodiments. To make its basic principle even clearer, one of these is illustrated in the drawing and is described below.

In the drawing.

DETAILED DESCRIPTION OF THE DRAWINGS

Figure 1:
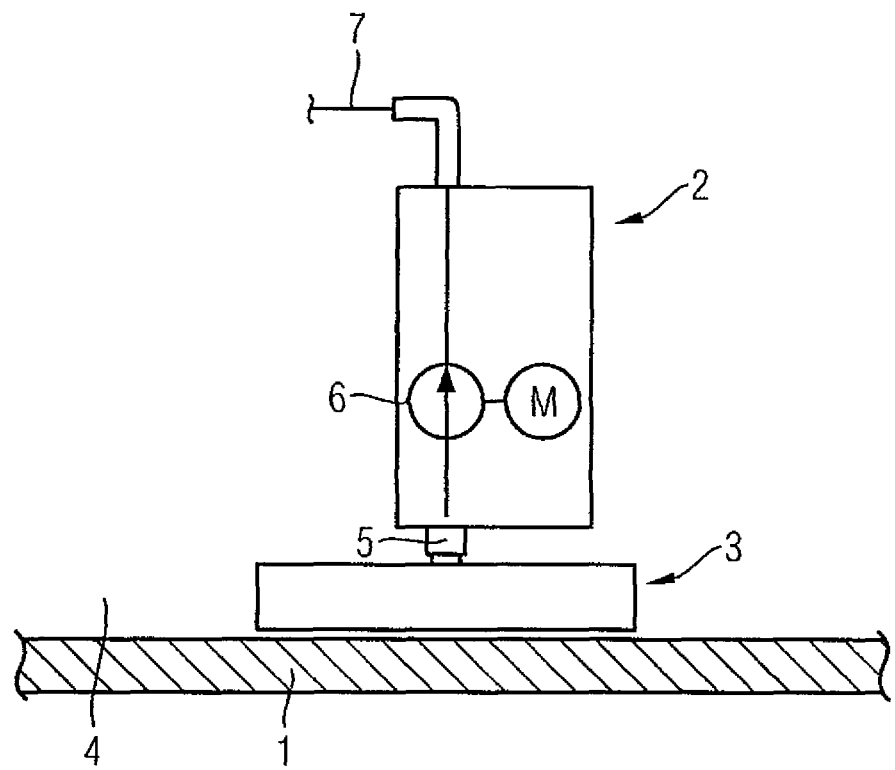
FIG. 1 is a fuel delivery unit having a prefilter arranged on a bottom of a storage tank.

FIG. 1 shows a fuel delivery unit 2 arranged on a bottom 1 of a storage tank 4 of a motor vehicle and having a prefilter 3. The prefilter 3 is arranged near the bottom 1 of the storage tank 4 and is connected via a connection piece 5 to the fuel delivery unit 2. The storage tank 4 may be a fuel tank of a motor vehicle. The fuel delivery unit 2 has an electromotively driven fuel pump 6, via which fuel is drawn in from the bottom 1 of the storage tank 4 through the prefilter 3 and delivered into a forward flow line 7 leading to an internal combustion engine, not illustrated.

Figure 2:
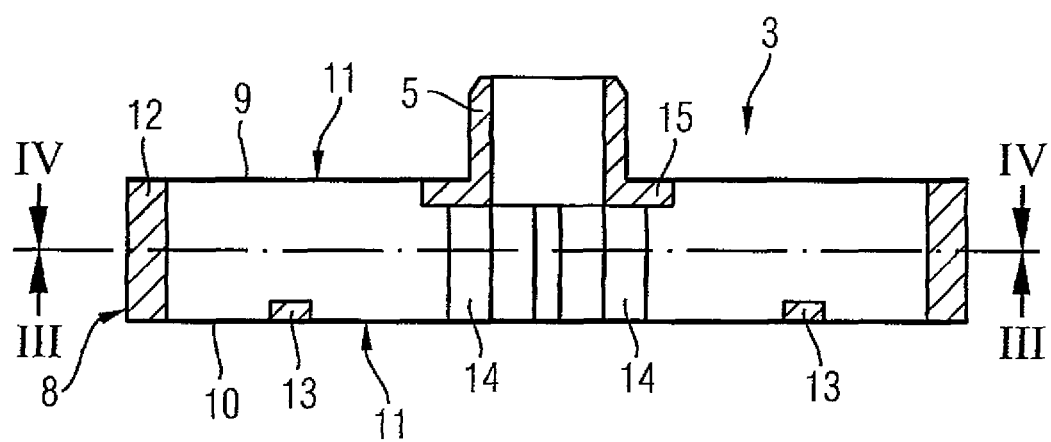
FIG. 2 is an enlarged view of the prefilter from FIG. 1 in longitudinal section.

The prefilter 3 is illustrated, enlarged, in FIG. 2. The prefilter 3 has two planar portions 9, 10 of filter fabric 11 which are arranged on a support element 8. The support element 8 has a support margin or frame 12, to the end faces of which the planar portions 9, 10 of the filter fabric 11 are fastened. The support margin 12 preferably tensions the planar portions 9, 10 of the filter fabric 11. For further support, the support margin 12 is manufactured in one piece with transverse webs 13. The transverse webs 13 are arranged offset with respect to the connection piece 5. Moreover, the connection piece 5 is manufactured in one piece with support ribs 14. The support ribs 14 extend to that portion 10 of the filter fabric 11 that is arranged remotely from the connection piece 5. The connection piece 5 has a flange 15, by which it is sealingly connected to one of planar the portions 9, 10 of the filter fabric 11.

Figure 3:
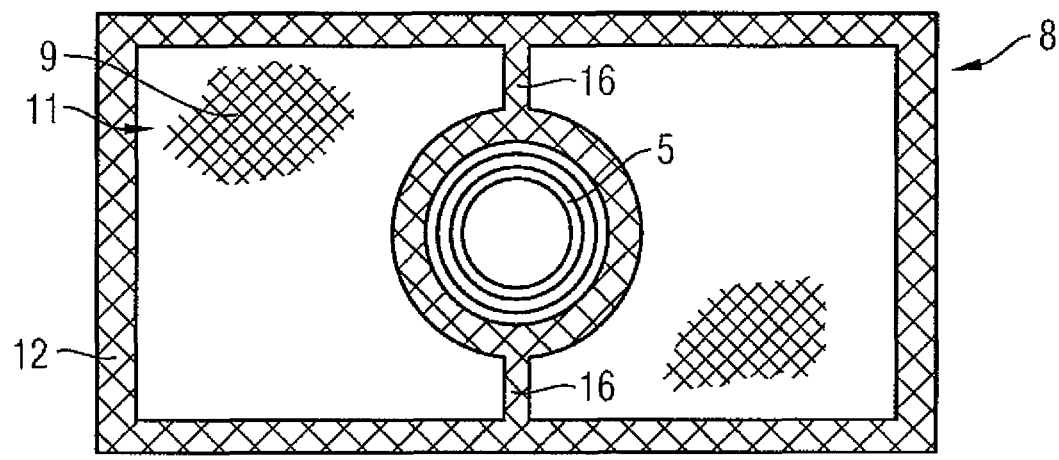
FIG. 3 is a sectional view through the prefilter from FIG. 2 along line III-III.
Figure 4:
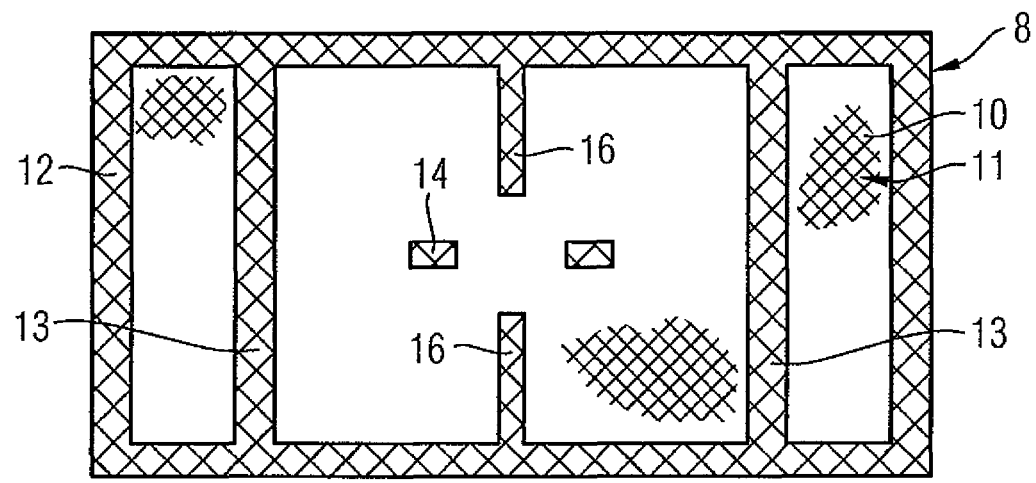
FIG. 4 is a sectional view through the prefilter from FIG. 2 along line IV-IV.

FIG. 3 is a sectional view through the prefilter 3 from FIG. 2 along the line III-III. The connection piece 5 is connected to the support margin 12 via webs 16. The support margin 12 is designed as a closed frame. For the sake of clarity, FIG. 4 shows the prefilter 3 in a sectional illustration along the line IV-IV from FIG. 2. Here, the offset arrangement of the webs 16 with the connection piece 5 and of the transverse webs 13 can be seen.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A prefilter for a fuel delivery unit comprising:
    a connection piece configured to couple the prefilter to the fuel delivery unit;
    at least one web;
    a frame, integrally formed with the connection piece, the at least one web configured to connect the frame and the connection piece;
    a filter fabric, the frame configured to support the filter fabric, a portion of the filter fabric being sealingly fastened to the frame, wherein the frame is adapted to be selectively connected to the filter fabric;
    at least one support rib extending along the height of the frame from the connection piece to a portion of the filter fabric located distal to the connection piece; and
    at least two transverse webs, each connecting one side of the frame to an opposite side of the frame.

2. The prefilter as claimed in claim 1, wherein the frame has at least one support margin, the at least one support margin having a face abutting the filter fabric, the face of the support margin being fastened to the filter fabric.

3. The prefilter as claimed in claim 2, wherein the support margin is configured to tension the filter fabric.

4. The prefilter as claimed in claim 1, wherein the frame is configured as a closed frame.

5. The prefilter as claimed in one of claims 1, wherein
    the connection piece is arranged parallel to a height axis of the frame and arranged on a first longitudinal face of the frame, and
    the at least two transverse webs are adapted to support the filter fabric on a side of the frame opposite the connection piece.

6. The prefilter as claimed in claim 1, wherein the at least one transverse web is arranged offset with respect to the connection piece.

7. The prefilter as claimed in claim 2, the at least one support rib comprising a plurality of support ribs configured to support the filter fabric.

8. The prefilter as claimed in claim 1, wherein the connection piece comprises a flange for sealing connection to the filter fabric.

9. The prefilter as claimed in claim 1, wherein the frame is manufactured from plastic.

10. The prefilter as claimed in claim 9, wherein the frame is manufactured by injection molding.

11. The prefilter as claimed in claim 1, wherein the frame has two end faces, and separate portions of the filter fabric are sealingly fastened to each of the two end faces.

12. The prefilter as claimed in claim 2, wherein the support margin has two end faces, and separate portions of the filter fabric are sealingly fastened to each of the two end faces.

* * * * *